US00RE36975E

United States Patent [19]

Williams

[11] E Patent Number: Re. 36,975

[45] Reissued Date of Patent: Dec. 5, 2000

[54] ATTIC HATCHWAY COVER

[76] Inventor: Steve L. Williams, 164 Mill Pond La., Mooresville, N.C. 28115

[21] Appl. No.: 09/003,657

[22] Filed: Jan. 7, 1998

Related U.S. Patent Documents

Reissue of:

[64] Patent No.: 5,481,833
Issued: Jan. 9, 1996
Appl. No.: 08/340,609
Filed: Nov. 16, 1994

[51] Int. Cl.[7] ..... E06B 7/00

[52] U.S. Cl. ..... 52/19; 52/202; 52/203; 160/180; 160/DIG. 18; 182/46; 182/81

[58] Field of Search ..... 52/19, 202, 203, 52/186; 160/180, DIG. 18; 182/46, 47, 77, 81

[56] References Cited

U.S. PATENT DOCUMENTS

| | | | |
|---|---|---|---|
| 2,321,499 | 6/1943 | Marschke . | |
| 3,251,399 | 5/1966 | Grossman . | |
| 4,151,894 | 5/1979 | Edwards | 182/77 |
| 4,281,743 | 8/1981 | Fuller | 182/46 |
| 4,312,423 | 1/1982 | Helbig | 182/46 |
| 4,337,602 | 7/1982 | King | 52/202 |
| 4,344,505 | 8/1982 | Waters et al. | 182/47 |
| 4,591,022 | 5/1986 | Sciambi et al. | 182/47 |
| 4,658,555 | 4/1987 | Steiner | 52/202 |
| 5,220,757 | 6/1993 | Hulligan | 52/202 |
| 5,271,198 | 12/1993 | Freeman | 52/202 |
| 5,368,085 | 11/1994 | Ruparelia | 160/327 |
| 5,475,955 | 12/1995 | Dickinson | 52/202 |
| 5,628,151 | 5/1997 | Monat | 52/19 |

*Primary Examiner*—Robert Canfield
*Attorney, Agent, or Firm*—Dougherty & Associates

[57] ABSTRACT

An attic hatchway cover wherein a tent-like structure having side walls, a front wall, and a rear wall each having a flange structure are arranged to engage and for securement to a hatchway opening framework employing mounting strips, such that fastening structure secures each mounting strip to each associated flange and simultaneously to the framework. [The] *In a preferred embodiment, the* top wall of the cover employs a flap member selectively securable to the top wall and displaceable therefrom by use of a generally U-shaped zipper to disengage the flap relative to the top wall.

12 Claims, 4 Drawing Sheets

ATTIC HATCHWAY COVER

Matter enclosed in heavy brackets [ ] appears in the original patent but forms no part of this reissue specification; matter printed in italics indicates the additions made by reissue.

*RELATED APPLICATION*

*This application is a reissue of U.S. Pat. No. 5,481,833 filed Nov. 16, 1994.*

TECHNICAL FIELD

The field of invention relates to hatchway insulative cover structure to minimize heat loss therethrough from a dwelling, and particularly to an attic hatchway cover wherein the same is arranged for ease of mounting and use relative to the hatchway opening.

BACKGROUND OF THE INVENTION

Hatchway cover structure is indicated in the prior art such as a unitary structure presented by U.S. Pat. No. 4,658,555 and the U.S. Pat. No. 4,832,153. U.S. Pat. No. 5,220,757 indicates a hatchway cover wherein a plate is movable between a first position and a second position to permit closure of a hatchway opening, as the structure is slidably mounted for such movement. U.S. Pat. No. 5,274,966 indicates a cover for a stair opening utilizing an interfitting [polyurathan] *polyurethane* type housing cover.

SUMMARY OF THE INVENTION

The attic hatchway cover of the invention includes a cover structure formed of insulative side walls, having a top wall utilizing a flexible flap, with access therethrough by utilization of a U-shaped zipper arranged to permit pivoting of the flap relative to the top wall of the hatchway cover.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various [forms therefore,] *forms. Therefore,* specific structural and functional details disclosed herein are not to be interpreted as limiting, but merely as a basis for the claims and as a representative basis for teaching one skilled in the art to variously employ the present invention in virtually any appropriately detailed structure.

Figure 1:
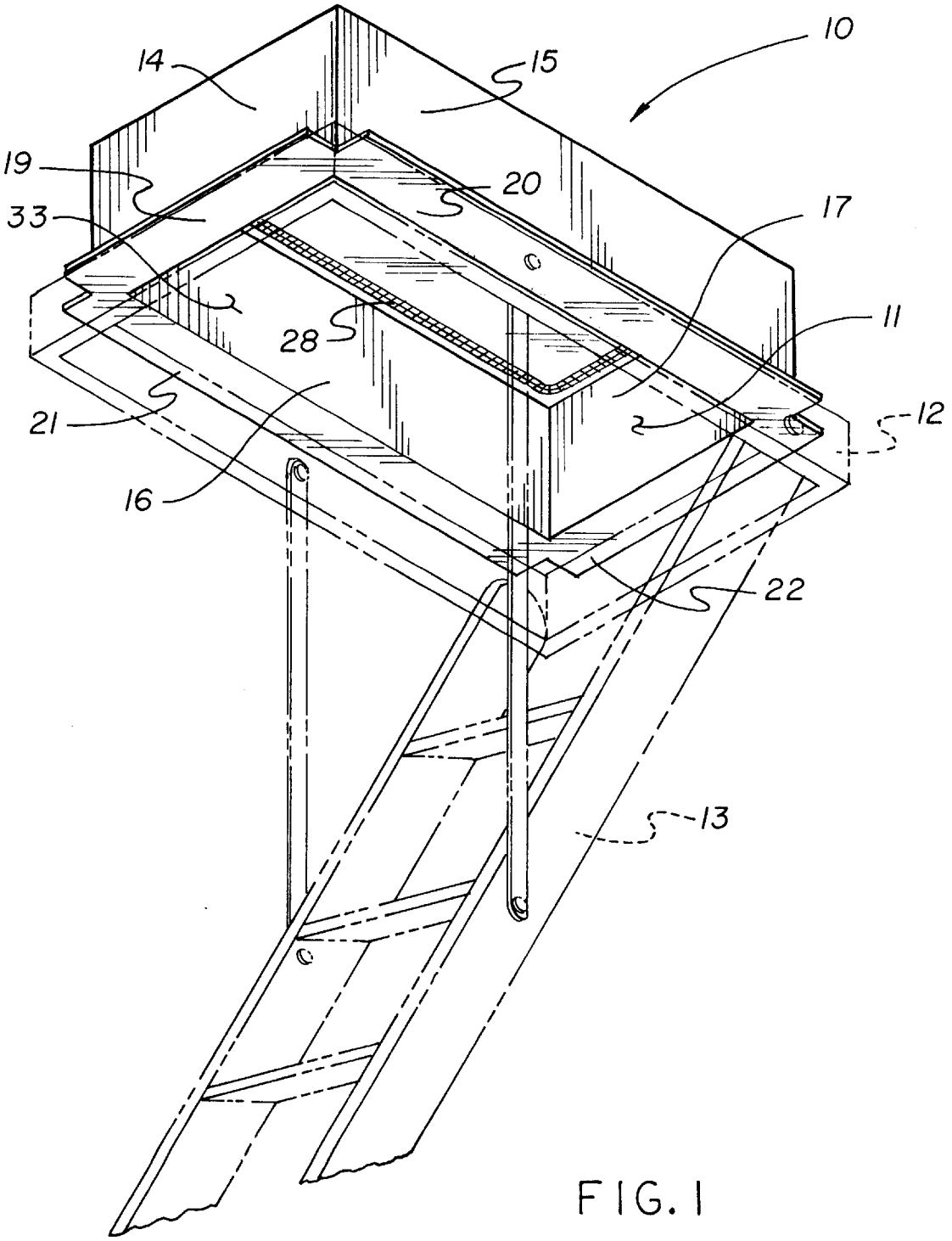
FIG. 1 is an isometric bottom view of the invention.
Figure 2:
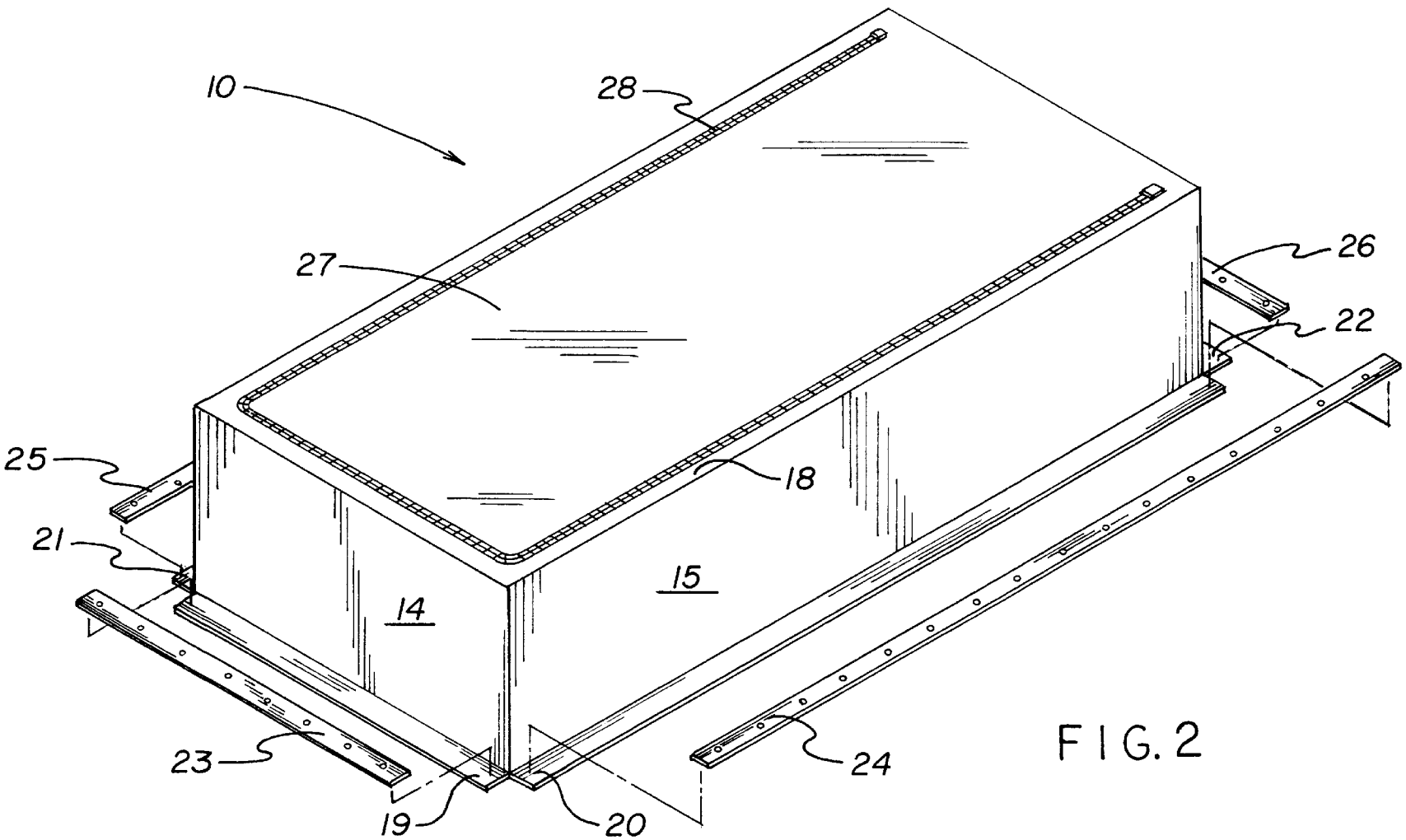
FIG. 2 is an isometric top view of the invention.
Figure 3:
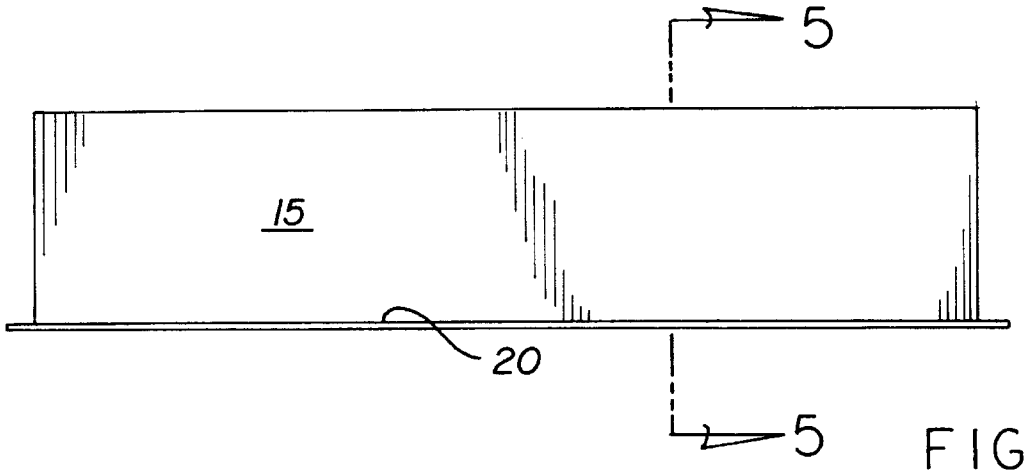
FIG. 3 is an orthographic side view of the invention.
Figure 4:
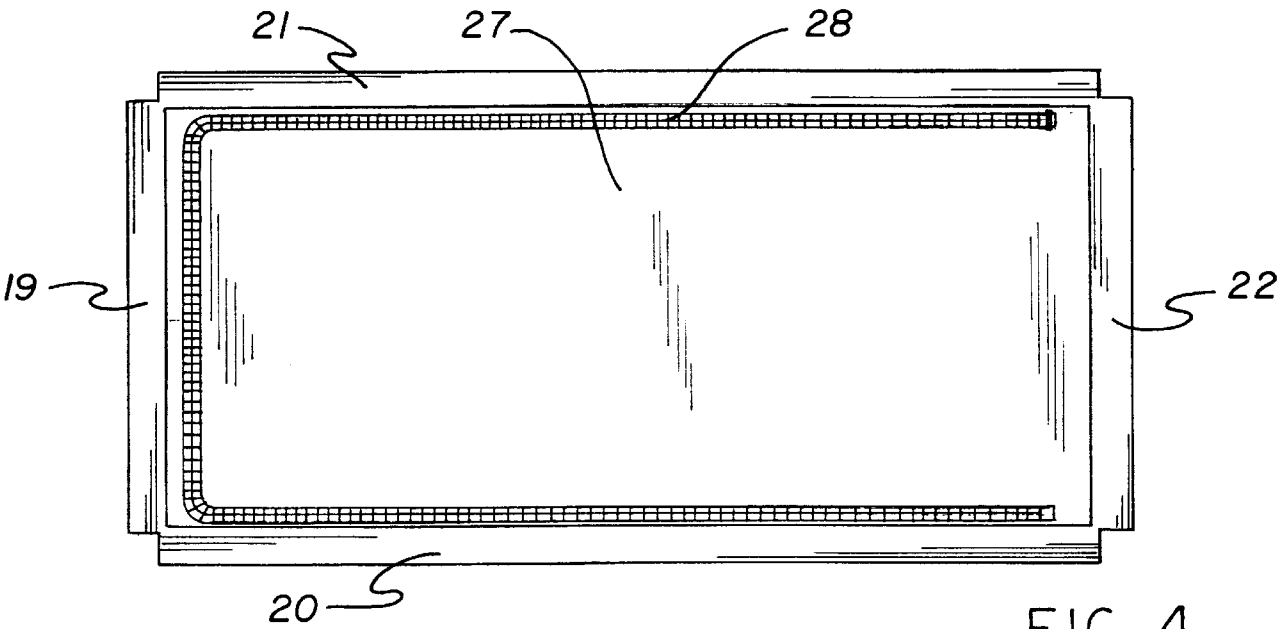
FIG. 4 is an orthographic top view of the invention.
Figure 5:
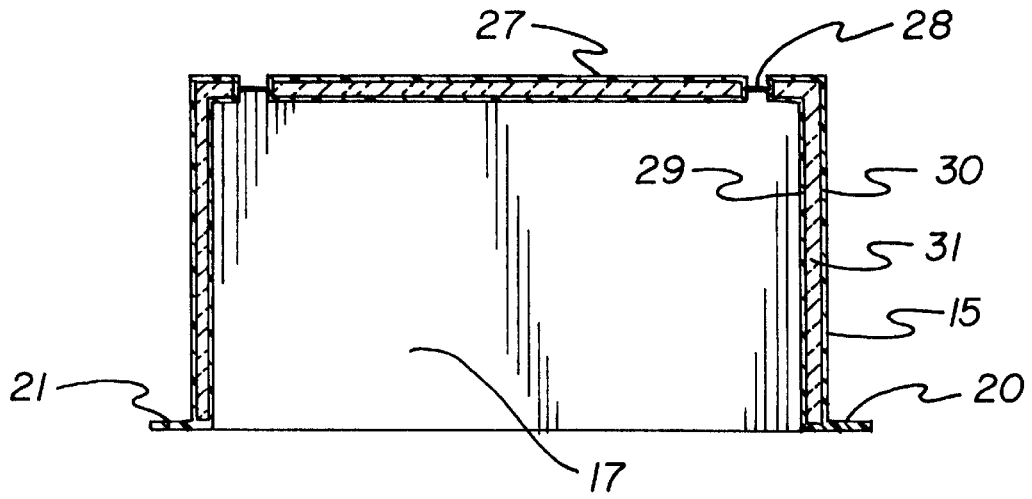
FIG. 5 is an orthographic view, taken along the line 5—5 of FIG. 3 in the direction indicated by the arrows.

More specifically, the attic hatchway cover 20 is arranged for mounting upon a surrounding framework 12 that extends about an attic opening 11, such as indicated in FIG. 1. Such attic openings 11 and the surrounding framework 12 typically mount a fold-away staircase 13, illustrated in phantom, which per se forms no part of the instant invention. The cover structure 10 is formed with a front wall 14 spaced from a rear wall 17 and a first side wall 15 spaced from a second side wall 16. A top wall 18 provides for a container assembly, such that the first side wall, the second side wall, the front wall, and the rear wall are typically of a rigid or at least semi-rigid construction, wherein the top wall 18 may be flexible in nature. *The attic hatchway cover 10 further includes means for providing access to the attic through the attic hatchway cover 10 and the attic opening 11. The means for providing access to the attic includes a generally U-shaped zipper member 28 that has a first leg parallel to the first side wall 15, a second leg parallel to the front wall 14, and a third leg parallel to the second side wall 16.* Specifically, a top wall flap 27 contained within the top wall is [specifically] of flexible construction, although as an alternative may be rigid and hingedly connected to the top wall adjacent the rear wall 17, such that [a] *the* U-shaped zipper [connector] *member* 28 separates the top wall flap 27 relative to the top wall for access through the top wall. The flexible construction of the top wall flap 27 would be more manually manipulative in use, or alternatively a rigid cover that employs a flexible and hinged connection relative to the top wall between the free distal ends of the U-shaped zipper would also function to permit access through the top wall 18.

Figure 6:
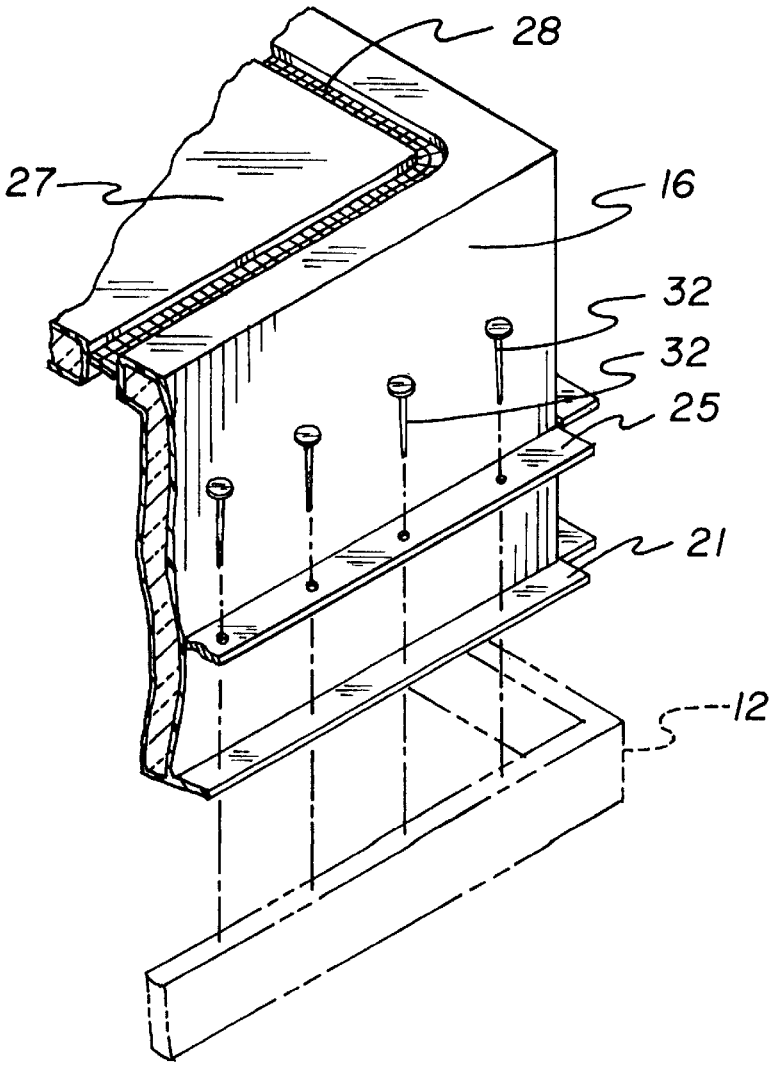
FIG. 6 is an enlarged, partial isometric illustration indicating fastener structure arranged for mounting the flanges of the side walls relative to a hatchway opening framework.

As illustrated, the front wall, the first side wall, the second side wall, and the rear wall each include a lowermost continuous end spaced an equal distance relative to the top wall, such that a front wall flange 19 extends obliquely and exteriorly of the interior cavity 13 of the cover structure 10, with a first side wall flange 20 extending exteriorly of the first side wall, a second side wall flange 21 extending exteriorly of the second side wall [18,] *16, and* with a rear wall flange 22 extending exteriorly of the rear wall 17. The respective first side wall flange 20, second side wall flange 21, the rear wall flange 22, and the front wall flange 19 are each arranged to be secured between the framework 12 and a respective second mounting strip 24, a third mounting strip 25, a fourth mounting strip 26, and a first mounting strip 23 to engage for example the front wall flange 19, with fasteners 32 available for employment, such as illustrated in FIG. 6, to secure each respective mounting strip to the framework 12, or alternatively other fastening means may be employed such as hook and loop fasteners, clasps, and the like.

Each wall of the cover 10 is preferably arranged to include an inner wall 29 spaced from an outer wall 30, having an insulative core 31 extending coextensively between the inner wall 29 and the outer wall 30 coextensive of a respective wall structure.

The front wall, the rear wall, and the first and second side walls may be formed of flexible construction, such that each corner intersection may employ a stiffener rod or the like (not shown) to maintain the geometric integrity of the cover structure in use.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. An attic hatchway cover arranged for securement onto a framework of an attic opening, wherein the cover comprises, a first side wall spaced from a second side wall and a front wall connected to a rear wall, wherein the front wall is fixedly and obliquely secured to the first side wall and the second side wall, and the rear wall is obliquely and fixedly secured to the first side wall and the second side wall, and the rear wall spaced from the front wall, a top wall extending coextensively to the front wall, the first side wall, the second side wall, and the rear wall to define a cavity within the cover, and the top wall having a zipper member, and the zipper member having a first end spaced from a second end, and the top wall having a flap hingedly secured to the top wall between the first end and the second end, and selectively secured to the top wall through the zipper member, wherein the front wall, the rear wall, the first side wall, and the second side wall are each of a rigid construction.

2. A cover as set forth in claim 1 wherein the flap is formed of flexible construction.

3. A cover as set forth in claim 2 wherein at least the front wall, the rear wall, and the first side wall and the second side wall each have an inner surface spaced from an outer surface, and a core extending coextensively between the inner surface and the outer surface.

4. A cover as set forth in claim 3 wherein the zipper member is of a U-shaped configuration to direct the zipper along the top wall in adjacency to the second side wall, the front wall, and the first side wall, with a first leg of the zipper member extending parallel to the first side wall, a second leg of the zipper member extending parallel to the second side wall, and a third leg of the zipper member extending generally parallel to the front wall.

5. A cover as set forth in claim 4 wherein the front wall includes a front wall flange projecting beyond the front wall oriented exteriorly of the cavity, the first side wall having a first side wall flange projecting exteriorly of the first side wall and extending obliquely relative to the first side wall, a second side wall flange secured to the second side wall extending obliquely relative to the second side wall extending exteriorly of the cavity, and a rear wall flange fixedly secured to the rear wall extending obliquely relative to the rear wall and exteriorly of the cavity, wherein the first side wall flange, the second side wall flange, the front wall flange, and the rear wall flange are coplanar.

6. A cover as set forth in claim 5 including a first fastener strip arranged to engage the front wall flange, a second fastener strip arranged to engage the first side wall flange, a third fastener strip arranged to engage the second side wall flange, and a fourth fastener strip arranged to engage the rear wall flange, and fastening means for securing the first fastening strip to the front wall flange, and for securing the second fastening strip to the second side wall flange, and for securing the third fastening strip to the third front wall flange, and for securing the fourth strip to the rear wall flange.

*7. An attic hatchway cover arranged for securement onto a framework of an attic opening, wherein the cover comprises:*

*a first side wall spaced from a second side wall and a front wall spaced from a rear wall, wherein said front wall is fixedly and obliquely secured to said first side wall and said second side wall and said rear wall is obliquely and fixedly secured to said first side wall and said second side wall, a top wall extending coextensively to said front wall, said first side wall, said second side wall and said rear wall to define a cavity within the cover; and*

*means for providing access to the attic through the cover and the attic opening, said means for providing access comprising a generally U-shaped zipper member having a first end spaced from a second end, said zipper member forming a flap with said top wall, said flap selectively secured to the top wall by said zipper member;*

*wherein said top wall comprises a hinge extending from said first side wall to said second side wall, said flap secured to said top wall by said hinge between said first end of said zipper member and said second end of said zipper member; and*

*wherein said front wall, said rear wall, said first side wall and said second side wall are each of a rigid construction.*

*8. A cover as set forth in claim 7 wherein at least said front wall, said rear wall, said first side wall and said second side wall each have an inner surface spaced from an outer surface and a core extending coextensively between the inner surface and the outer surface.*

*9. An attic hatchway cover according to claim 8*

*wherein said front wall comprises a front wall flange projecting obliquely from said front wall and extending exteriorly of the cavity, said first side wall comprising a first side wall flange projecting obliquely from said first side wall and extending exteriorly of the cavity, said second side wall comprises a second side wall flange projecting obliquely from said second side wall and extending exteriorly of the cavity, and said rear wall flange projecting obliquely from said rear wall and extending exteriorly of the cavity; and*

*wherein said first side wall flange, said second side wall flange, said front wall flange and said rear wall flange are coplanar.*

*10. A cover as set forth in claim 9 including a first fastener strip arranged to engage the front wall flange, a second fastener strip arranged to engage the first side wall flange, a third fastener strip arranged to engage the second side wall flange, and a fourth fastener strip arranged to engage the rear wall flange, and fastening means for securing the first fastening strip to the front wall flange, and for securing the second fastening strip to the second side wall flange, and for securing the third fastening strip to the third front wall flange, and for securing the fourth strip to the rear wall flange.*

*11. An attic hatchway cover according to claim 10 wherein said U-shaped zipper member comprises a first leg extending parallel to said first side wall adjacent said first side wall flange, a second leg extending parallel to said front wall adjacent said front wall flange and a third leg extending parallel to said second side wall adjacent said second side wall flange.*

*12. An attic hatchway cover according to claim 10 wherein said U-shaped zipper member comprises a first leg extending parallel to said first side wall opposite said first side wall flange, a second leg extending parallel to said front wall opposite said front wall flange and a third leg extending parallel to said second side wall opposite said second side wall flange.*

* * * * *